(12) United States Patent
Jonasson et al.

(10) Patent No.: US 11,310,999 B2
(45) Date of Patent: Apr. 26, 2022

(54) AQUACULTURE PROCESS FOR THE PRODUCTION OF SALMON EGGS

(71) Applicant: STOFNFISKUR HF, Hafnarfjordur (IS)

(72) Inventors: Jonas Jonasson, Hafnarfjordur (IS); Bara Gunnlaugsdottir, Reykjanesbaer (IS); Hreidar Hreidarsson, Hafnarfjordur (IS); David Hardarson, Vogar (IS)

(73) Assignee: Stofnfiskur HF, Hafnarfjordur (IS)

( * ) Notice: Subject to any disclaimer, the term of this patent is extended or adjusted under 35 U.S.C. 154(b) by 0 days.

(21) Appl. No.: 16/768,777

(22) PCT Filed: Nov. 30, 2018

(86) PCT No.: PCT/IS2018/050013
§ 371 (c)(1),
(2) Date: Jun. 1, 2020

(87) PCT Pub. No.: WO2019/106697
PCT Pub. Date: Jun. 6, 2019

(65) Prior Publication Data
US 2020/0367474 A1  Nov. 26, 2020

(30) Foreign Application Priority Data

Dec. 1, 2017 (IS) .......................................... 050197

(51) Int. Cl.
*A01K 61/10* (2017.01)
*A01K 61/95* (2017.01)
(Continued)

(52) U.S. Cl.
CPC .............. *A01K 61/10* (2017.01); *A01K 61/17* (2017.01); *A01K 61/95* (2017.01); *A01K 63/065* (2013.01)

(58) Field of Classification Search
CPC ...... A01K 61/10; A01K 63/065; A01K 61/17; A01K 61/00; A01K 61/90; A01K 61/95
See application file for complete search history.

(56) References Cited

U.S. PATENT DOCUMENTS 3,446,185 A * 5/1969 Cavanagh .............. A01K 61/10
119/217
3,765,372 A * 10/1973 Moe, Jr. ................. A01K 61/17
119/217
(Continued)

FOREIGN PATENT DOCUMENTS

| CN | 101049092 A | 10/2007 |
| CN | 101669452 A | 3/2010 |

(Continued)

OTHER PUBLICATIONS

International Search Report and Written Opinion for International Application No. PCT/IS2018/050013 dated Jun. 6, 2019.
(Continued)

*Primary Examiner* — David J Parsley
*Assistant Examiner* — Carly W. Lynch
(74) *Attorney, Agent, or Firm* — Julie K. Staple; Dinsmore & Shohl LLP

(57) ABSTRACT

A process for harvesting fish eggs is provided, in particular fish eggs from Salmon. The process comprises rearing sexually immature salmon in an aquatic environment in stages during which at least the light exposure and time span is adjusted. The rearing includes at least a winter-summer period that comprises a winter life-cycle stage, within which the broodstock is exposed to light that simulates winter light exposure, and a subsequent summer life-cycle stage, within which the broodstock is exposed to light that simulates summer light exposure, wherein the total Accumulated Thermal Unit (ATU) during the winter-summer period is no (Continued)

more than 5000. The inventions also provides salmon eggs that are produced by the disclosed process.

26 Claims, 8 Drawing Sheets

(51) Int. Cl.
*A01K 63/06* (2006.01)
*A01K 61/17* (2017.01)

(56) References Cited

U.S. PATENT DOCUMENTS

| | | | | |
|---|---|---|---|---|
| 4,385,589 A | * | 5/1983 | Knowles | A01K 61/00 119/217 |
| 4,998,505 A | * | 3/1991 | Jordan | A01K 61/17 119/218 |
| 5,176,100 A | * | 1/1993 | Fujino | A01K 63/04 119/227 |
| 6,443,097 B1 | * | 9/2002 | Zohar | A01K 63/04 119/217 |
| 2006/0081532 A1 | * | 4/2006 | Drahos | C12N 1/20 210/601 |
| 2017/0208840 A1 | | 7/2017 | Nordly | |

FOREIGN PATENT DOCUMENTS

| | | | | |
|---|---|---|---|---|
| CN | 103 503 820 A | | 1/2014 | |
| CN | 103583440 A | | 2/2014 | |
| CN | 103734064 A | | 4/2014 | |
| CN | 110178768 A | * | 8/2019 | ............ A01K 61/10 |
| WO | WO-2015086542 A1 | * | 6/2015 | ........... H05B 47/105 |
| WO | WO-2017211881 A1 | * | 12/2017 | ........... A23K 20/158 |

OTHER PUBLICATIONS

Geir Lasse Taranger et al: Abrupt 1 changes in photoperiod affect age at maturity, timing of ovulation and plasma testosterone and oestradiol-17[beta] profiles in Atlantic salmon, *Salmo salar*, Aquaculture, vol. 162, No. 1-2, Mar. 1, 1998 (Mar. 1, 1998), pp. 85-98.

* cited by examiner

AQUACULTURE PROCESS FOR THE PRODUCTION OF SALMON EGGS

FIELD

The invention relates to methods of producing eggs from mature fish. In particular, the invention relates to a process for the production of ova from Atlantic salmon (*Salmo salar*).

INTRODUCTION

Atlantic salmon (*Salmo salar*) is a fish species of the Salmonoid family. The species is found in the northern Atlantic Ocean, in rivers that flow into the north Atlantic and in the North Pacific Ocean, as a result of human introduction.

The natural life cycle of salmon proceeds through a number of stages. Salmon are initially born in gravel nests at the bottom of a fresh water stream or river in the form of small translucent eggs. The eggs, also referred to as roe, are usually pink or red in colour and roughly spherical. The eggs develop over a period of 2 to 3 months in their natural habitat. During this time period, the eyes and other organs start to develop and become visible.

Hatching is the process whereby the salmon offspring breaks free from its egg, but retaining the yolk as a source of nutrients. At this point, the salmon are called Alevin, being of roughly 2-3 cm in length. The Alevin remain hidden in the gravel and feed from the egg yolk until it is absorbed.

The salmon leaves their nest as small Fry, and begin to swim around to feed themselves. At this point, they also start to migrate downstream the river. With time, after several months, the Fry develop into Parr, which are characterized by markings on their bodies.

The Parr spend a wide range of time in their natal river, or from one to as many as eight years. A natural process, smoltification, changes the camouflage of the fish (turning silver in colour) and provides adaptation to the osmotic difference between fresh water and seawater. The fully smoltified fish, called smolt, migrates to sea where they follow sea surface currents and feed on plankton or fry.

The adult salmon spends from 1 to 4 years in the ocean, where the salmon matures sexually, grows and develops its unique camouflage. The large natural variation in the time to maturation is noteworthy, and presumably due to a mixture of genetic and environmental factors. The sexually mature salmon subsequently migrates back to its native river for spawning, which typically occurs during fall and early winter.

In general, the age at maturation represents a trade-off between fitness and risk of dying before first reproduction; thus, larger fish in general are better fit for successive reproduction, but advanced age can also have a negative effect on successful reproduction.

Farming of Atlantic salmon is based on simulating the conditions required in nature to produce adult salmon on large scale, while also speeding up the growth phase to increase production. Thus, salmon eggs are fertilised using milt collected from male salmon and allowed to hatch. After hatching, the resulting fry is allowed to mature and develop in freshwater tanks. Most salmon farms rear the smoltified salmon in the sea. Thus, after smoltification, the smolt are usually transferred to floating sea cages or net pens that have been anchored in sheltered bays or in fjords along the coast.

It is known that both genetic and environmental factors influence the salmon maturity process, both in natural and artificial (farming) setting. In particular, it is known that water temperature and light conditions can have an effect on maturation in Atlantic salmon (*Salmo salar*).

Fjelldal et al. (Aquaculture 321 (2011), 93) report that a combination of elevated temperature and continuous light can trigger maturation both during and immediately after smoltification in male Atlantic salmon.

In another study, Taranger et al. (Aquaculture 162 (1998), 85) report that light conditions affect age at maturity and timing of ovulation in Atlantic salmon rerared in sea cages. It was found that ovulation time was advanced by exposure to light for up to 24 hours per day in the first half of the calendar year, followed by shorter daylengths from July onwards. By contrast, continuous exposure to light delayed ovulation time. Further, it was found that accelereated photoperiods resulted in lower egg survival, indicating that excessive light may have detrimental effects on gamete quality.

Imsland et al. (Aquacult Int 22 (2014), 1331) investigated the effects of two photoperiods, continuous light and simulated natural photoperiod, on sexual maturation in male Atlantic salmon, pre and post smolt. It was found that long-term rearing in continuous light and fairly high temperature (12.7° C.) improved growth and maturation proportion.

The effects of temperature on salmon growth have also been investigated, with growth in general increasing in a linear fashion with increased temperature, at least during salmonid growth (Brett, in Fish Physiology Vol. VIII, pp 599-675 (1979)). It has also been reported that salmon growth is optimal at or around 14° C.

Although the effects of photocycle and temperature on salmon maturation have been studied extensively, their interaction is complex and remains rather poorly understood. There are indications that lower temperature correlates with reduced maturation during the first sea-winter (after smoltification), with concomitant decreased rate of grilsing (early maturation) (Saunders et al., Aquacult 33, 107-118(1983)). Further, Fjelldal et al. (Aquaculture 321, 93-100 (2011)) have suggested that increased temperature is important for triggering maturation following smoltification. However, it is clear that the interaction of these and other factors on maturation is complex, and their separation is therefore very difficult.

Moreover, the effects of photocycle, temperature or other environmental and genetic factors on egg development following maturation, alone or in combination, are poorly understood.

Breeding of Atlantic salmon starts with fertilized salmon eggs, and proceeds through stages of larval growth, nursery and adult growth. High quality eggs are a precondition for successful breeding. In nature, only a small percentage of eggs survive to hatch. Although well-controlled conditions within hatcheries have resulted in significantly improved survival rates, there is a continuous demand for high quality eggs, i.e. eggs that develop normally with minimal loss due to viability issues. Furthermore, to meet market demands for year-round production, there is a demand for fertilized eggs on a constant basis, irrespective of the season. Since normal spawning is highly seasonal, there is a need for breeding programs that can provide year-round production of high quality, viable eggs.

DESCRIPTION

It is an objective of the present invention to provide a process for the improved production of salmon eggs. It is a further objective to provide a process that is able to provide viable salmon eggs on a continuous basis across all seasons.

The inventors have discovered that certain growth conditions of mature salmon result in optimal salmon egg production, resulting in large eggs having high viability. Moreover, the process can be adapted to provide salmon eggs on a continuous basis, by adjusting certain parameters (e.g., water temperature, photocycle).

In particular, it has been discovered that the Accumulated Thermal Unit (ATU) during a period of salmon rearing that includes at least one cycle of a winter conditions (predominant darkness) followed by summer conditions (predominant light), defined as a winter-summer period herein, should be within a certain range to result in salmon eggs that are of high quality (large, viable eggs).

Summer and/or winter conditions can be simulated during rearing by adjusting the amount of light that the fish is exposed to. Thus, in practical terms it may be useful to be able to adjust light so that during a period of salmon rearing that includes at least one cycle of simulated winter conditions (predominant darkness) followed by simulated summer conditions (i.e. simulated summer light exposure, characterized by predominant light), the ATU should be within a certain range to result in salmon eggs that are of high quality (large, viable eggs).

An Accumulated Thermal Unit (ATU), in the present context, is a unit of measurement used to describe the cumulative effect of temperature over a period of time. One ATU equals 1 degree Celsius for 1 day (24 hours). By way of example, an environment that has a constant temperature of 10° C. would accumulate 10 ATU per day, and over a period of one month (30 days), the environment would accumulate 300 ATU.

In accordance with the foregoing, the invention in an aspect provides a process for the harvesting of fish eggs, comprising steps of (i) providing a broodstock comprising sexually immature fish from at least one *Salmo salar* strain; (ii) rearing the broodstock in an aquatic environment comprising an aqueous medium that is suitable for sustaining life of the broodstock such that it proceeds to maturation, wherein the rearing is performed in life-cycle stages during which at least the light exposure and time span of each life cycle stage is adjusted, wherein the rearing includes at least a winter-summer period that comprises a winter life-cycle stage, within which the broodstock is exposed to light that simulates winter light exposure, and a subsequent summer life-cycle stage, within which the broodstock is exposed to light that simulates summer light exposure, wherein the total Accumulated Thermal Unit (ATU) during the winter-summer period is no more than 5000; and (iii) harvesting eggs from the mature fish.

The term "aquatic environment" or "aquasystem environment" should be understood as representing an environment in a body of water. Aquatic environments or aquasystem environments can be marine environments or they can be freshwater environments. The environments can be based on land or they can be based in an open body of water, such as open sea or in open (usually fresh-water) lakes.

The invention further provides eggs, in particular eggs from *Salmo salar* produced by the process as disclosed herein.

The invention also provides a process of rearing *Salmo salar* in particular a process as described in the following description.

The winter-summer period preferably is continuous, i.e. during this period there is a summer life-cycle stage that immediately follows the winter life-cycle stage.

There can be additional life-cycle stages that precede the winter-summer period. Thus, the broodstock can be reared under conditions that include at least one summer period, during which the broodstock is exposed to light that simulates summer light exposure, prior to the winter-summer period. This preceding summer period can be interrupted by one or more winter periods, during each of which the broodstock can be reared under conditions that simulate winter light exposure.

The broodstock preferably has reached a certain size prior to the onset of the winter-summer period that has a total ATU of no more than 5,000 ATU, so as to result in optimal egg production. Thus, prior to the winter-summer period, the broodstock can be allowed to grow such the average weight of the broodstock is at least 50 g per fish, preferably at least 100 g per fish, more preferably at least 200 g per fish, more preferably at least 300 g per fish, more preferably at least 500 g per fish, more preferably at least 1000 g per fish, more preferably at least 2000 g per fish, even more preferably at least 3000 g per fish, even more preferably at least 4000 g per fish.

During rearing that precedes the winter-summer period, the broodstock can be allowed to smoltified. Thus, during a period that precedes the winter-summer period and that includes at least a summer life-cycle, that may optionally be interrupted by one or more winter life-cycles, the broodstock can be allowed to smoltify. Thus, in certain embodiments, the broodstock is reared to smoltification prior to the rearing under the winter-summer period during which the total ATU is no more than 5,000 ATU. Following smoltification, the broodstock can be reared during a summer light-cycle that precedes the winter-summer period until the broodstock has reached a size that is preferable for the following winter-summer rearing.

Smoltification can include a rearing period that includes a period of about 4 weeks during which the broodstock experiences summer light conditions. Prior to this period, the broodstock can be reared for 4-7 weeks during conditions of about 50% daylight in each 24 cycle, i.e. 12 hours of light followed by 12 hours of darkness in each 24 hour period. Other light conditions that allow for smoltification are also compatible with the downstream rearing of the broodstock to produce optimal eggs.

Following the winter-summer period, the fish can be reared under winter light conditions or light conditions that simulate winter light exposure, i.e. the rearing includes a following winter life-cycle. During this life-cycle, a so-called holding stage, the fish is preferably maintained under conditions of winter light exposure, or simulated winter light exposure, until the fish is spawning. Once the fish is spawning, the mature eggs can be harvested from the fish.

The invention in another aspect provides a process for the harvesting of fish eggs, comprising a first step of providing a broodstock comprising smoltified sexually immature fish from at least one *Salmo salar* strain. Subsequently, rearing the broodstock in an aquatic environment comprising an aqueous medium that is suitable for sustaining life of the broodstock such that it proceeds to maturation, wherein the rearing is performed in life-cycle stages, and wherein at least the light exposure and time span of each life cycle stage is adjusted, so that (a) in a first life-cycle stage, the broodstock is exposed to photo cycles that simulate summer light exposure, so that, at the end of the life-cycle stage, the average weight of the broodstock is at least 0.1 kg, at least 0.2 kg, at least 0.5 kg or at least 1.0 kg; (b) in a period (winter-summer period) that follows the first life-cycle and that includes at least a second life-cycle stage, within which the broodstock is exposed to light that simulates winter light exposure, and a subsequent third life-cycle stage, within which the broodstock is exposed to light that simulates summer light exposure, the total Accumulated Thermal Unit (ATU) is no more than 5000; and (c) in a holding stage that follows all previous stages, the broodstock is exposed to photo cycles that simulate winter light exposure and maintained at those conditions until the broodstock has matured to spawning. Finally, eggs are harvested from the mature fish. The fish that enters the winter-summer rearing period can in certain embodiments be salmon that is 1 to 5 year old, or 2 to 5 year old, or 3 to 5 year old, i.e. the salmon has been reared for 1 to 5 years, 2 to 5 years, or 3 to 5 years prior to the winter-summer period. In an embodiment, the salmon is 4 year old salmon.

In an embodiment, the overall process can be depicted in a simplified manner as a simulated progression of summer-winter-summer-winter life cycle periods, where each period or season is characterized by conditions that mimic the conditions the salmon experiences in the wild (i.e. natural light variations). The first summer in this sequence can be the life-cycle stage that follows smoltification during which the salmon growths to an optimal size for subsequent maturation and spawning. The last winter, by contrast, can be represented by the holding stage, during which the salmon is in a holding pattern and waiting to spawn, simulating the conditions in natal rivers.

Salmon experiences changes seasonal light conditions, i.e. the salmon is light sensitive and responds to light in a seasonal manner. Without intending to be bound by theory, the salmon brain, in particular the saccus vasculosus, is believed represent a seasonal sensor (Nakane et al, Nature Comm 2013, 3:2108). The seasonal mechanism is believed to include photoreceptors and hormone regulating genes, that are able to transform changes in external light to hormonal output and thereby physiological changes. Accordingly, by exposing salmon to variant degrees of light or darkness, seasonal physiological changes in the salmon can be triggered. For example, light exposure for an average of about 12 or more hours in each 24 hour period can be experienced by the fish as a summer period. By contrast, light exposure for an average of about 12 hours or less in each 24 hour period is experienced as a winter period. As a consequence, a simulated summer life cycle can include light exposure that is on average for 12 hours or more in each 24 hour period, and a simulated winter life cycle can include light exposure that is on average no more than 12 hours in each 24 hour period.

Accordingly, "winter" or "simulated winter", or "simulated winter light exposure" in the present context can be considered to represent a life-cycle stage wherein light conditions are within certain light exposure limits. A winter can include, on average, light exposure for 0 to about 12 hours, light exposure for 0 to about 10 hours, 0 to about 8 hours, light exposure for 0 to about 6 hours, light exposure for 0 to about 5 hours, light exposure for 0 to about 4 hours, light exposure for 0 to about 3 hours, light exposure for 0 to about 2 hours, light exposure for 0 to about 1 hours, or no light exposure in every 24 hour cycle. Preferably, a winter includes light exposure for 0 to 8 hours in every 24 hour cycle.

A "summer", or "simulated summer", or "simulated summer light exposure" in the present context, can by contrast include light exposure, on average, for at least 8 hours, at least 10 hours, at at least 12 hours, at least 14 hours, at least 16 hours, at least 18 hours, at least 20 hours, at least 22 hours, or for all 24 hours in every 24 hour cycle. Preferably, during a summer stage, there is light exposure for about 20 to about 24 hours, or about 22 hours, or about 23 hours, or about 24 hours in every 24 hour cycle.

Obviously, light exposure changes gradually in the wild. Accordingly, a summer life-cycle and a winter-life cycle can be characterized by a gradual change in light that simulates the change in light that occurs in the wild. Accordingly, in certain embodiments, transition to a summer life-cycle can comprise conditions during which light conditions are allowed to gradually change from winter light exposure to summer light conditions, i.e. there can be gradual change in light exposure, from conditions that simulate winter light exposure to conditions that simulate summer light exposure. During such a period, there can therefore be a gradual change in light exposure during each 24 hour cycle, such that the fist at first experiences light conditions that it experiences as winter light exposure, and over a subsequent time period there is a change in the amount of light in each 24 hour cycle so that the fish slowly is exposed to light conditions that it experiences as summer light conditions. Similarly, a winter life-cycle can comprise conditions during which light conditions are allowed to gradually change from summer light exposure to summer light conditions, i.e. there can be gradual change in light exposure, from conditions that simulate summer light exposure to conditions that simulate winter light exposure. Once light conditions that the fish experiences as winter and/or summer light conditions have been reached, they can be maintained for a desired period of time such that the fish experiences light conditions that it perceives as representing a single season (winter or summer).

It will be appreciated that light conditions that simulate summer or winter light exposure can be provided in the form of a time period that includes particle or complete exposure to ambient light conditions, as long as the salmon experiences the corresponding season, i.e. winter or summer. This can be done fore example when the rearing is performed in open tanks or open cages. Thus, simulated summer light conditions can be provided in the form of exposure to ambient light during a summer, or a part of a summer (e.g., during a part or all of of the period from about May to August). Likewise, light conditions that simulate winter light can be provided in the form of ambient winter darkness conditions, e.g. by exposure to ambient light during a part, or all of, the period from about October to March. Obviously, such winter exposure is naturally more prominent in the northern parts of the Northern hemisphere and southern parts of the Southern hemispheres.

However, it may in practice be convenient to change the artificial light conditions abruptly, i.e. by changing from winter to summer conditions or vice versa with no transitional period, i.e. by an immediate change in light conditions. Alternatively, the change in light conditions can be done over a certain period of time that can range from days to months. For example, the change in light conditions can mimic the very gradual change experienced in the wild. Alternatively, the change in light conditions can be made over a period of a few days to a few weeks or longer. For example, change in light conditions can be done within a period of about 1 week to about 4 weeks. Alternatively, the change in light conditions can be done within a period of about 1 day to about 7 days.

Although typically light can either be switched on or off, i.e. there is a continuous exposure of light for a certain period (e.g., 16 hours of light in each 24 hour period), followed by darkness (no light) for a certain period, there can be brief periods of light irradiation during an otherwise "dark" period. For example, if the fish need to be fed, or conditions within the fish rearing plant need to be inspected, light can be switched on for a brief period, typically a few minutes, during which time feeding, maintenance or other work can be performed. After such brief light exposure, lights can be switched off so that the fish continues to experience a "dark" phase. Accordingly, such interruptions in an otherwise dark phase do not affect the manner in which the fish experiences the period, i.e. as a period of darkness.

The advantages of the invention are a result of specifically controlling conditions (in particular light and temperature) and time of each life-cycle stage, and in particular by (i) controlling the size/weight of the fish following the first summer period, and (ii) keeping the ATU during the subsequent winter-summer period within an optimal range that has been found to result in optimal conditions for the fish to reach sexual maturation, with subsequent production and maturation of eggs having high quality and viability.

Smoltified fish for use in the process according to the invention can be produced by conventional methods. This includes conventional methods of incubating, hatching and rearing fry and parr through the smoltification stage, using any particular strain of *Salmo salar*. The process is applicable for single strain cultures or blended cultures, i.e. cultures that include two or more strains of *Salmo salar*. It can be preferable to harvest eggs from a single strain of *Salmo salar* in each batch being processed in accordance with the invention. In other words, it can be preferable to keep different strains separate (e.g., in separate tanks or cages) during the farming and harvesting process. Accordingly, the process can preferably be applied by providing a broodstock from a single strain of *Salmo salar*.

Smoltified broodstock can be reared under conditions that simulate summer light exposure, until the broodstock has reached an appropriate size, that can in certain embodiments be in the range of 500 g to 6000 g, such as 1000 g to 5000 g, 2000 g to 5000 g, or 3000 g to 4000 g. The smoltified can subsequently be reared for at least a winter-summer period as described herein, so as to proceed to maturation and subsequent spawning.

By slaughter-time, salmon that is reared for human consumption has usually reached a weight of 2 to 8 kg. The salmon that is used in the process of the present invention, i.e. salmon that will undergo rearing during a winter-summer period can thus be salmon that has been reared using similar or the same conditions as used during conventional salmon farming.

The inventors have discovered that salmon that reached a certain weight is more likely to produce high quality, viable eggs. Accordingly, the salmon that is used for egg production can weigh about 1 to 10 kg, about 2 to 10 kg, about 2 to 8 kg, about 2 to 6 kg, about 1 to 5 kg, about 2 to 5 kg, about 3 to 5 kg, or about 4 kg, at the end of a post-smolt summer period (period of predominantly light conditions that follows smoltification), more preferably about 4 kg. Thus, a first life-cycle stage (a simulated summer period) in the process in accordance with the invention that precedes the winter-summer period can be longer than the summer period that would be used during rearing for human consumption, so that the fish can reach an appropriate size for the downstream photocycle periods (winter-summer period, followed by an holding stage period).

The aquatic environment can be, or comprise, an open aquaculture system or a closed aquaculture system. The system can be on sea or the system can be land based. The system can also be partially on sea and partially land based. For example, the system can comprise one or more tanks that are on sea and used for one or more of the rearing periods, and the system can further comprise one or more tanks that are on land used in one or more of the rearing periods, that are different from the rearing periods performed on sea. The aquatic environment can comprise one or more open aquaculture systems. Open aquaculture systems are typically enclosures that have been provided within natural waterways. Common open aquaculture systems include sea cages, such as floating mesh cages. The cages can be anchored to the seafloor. The aquaculture systems can also comprise closed sea-based tanks or cages.

In an embodiment, the salmon is reared using a combination of ambient and artificial light conditions. For example, the salmon can be reared to a certain size in ambient light, followed by rearing using simulated seasonal conditions (summer and/or winter).

In one such embodiment, salmon is reared at ambient conditions in sea-based tanks or cages over a timer period that includes at least one winter. For example, the salmon can be reared for a period of about 9 to 15 months, or about 12 months, including a winter. Once the salmon has reached a certain size, for example a size of about 4 to 8 kg, it is exposed to simulated summer light conditions. This summer rearing step can be performed in sea-based cages or tanks, or it can be performed in closed land-based tanks. Subsequently, the salmon can be exposed to winter light conditions until it is spawning and eggs can be harvested.

In one such embodiment, salmon is reared in open sea-based cages for about 12 months under ambient conditions. At the end of this time period, which can be preferably in March, the salmon is exposed to artificial summer conditions (e.g., by exposing the salmon to light for 22 hours a day), either in sea-based cages or on land in closed tanks. Finally, after an exposure to summer conditions for about 3 months, light conditions are changes to simulate winter, preferably in closed tanks (either land-based or in sea). During this stage, the salmon proceeds to spawning, at which point eggs can be harvested.

From the foregoing, it should be apparent that the winter-summer period can be performed using partially ambient conditions that simulate winter conditions and partically artificial light conditions that simulate summer light conditions.

As an alternative, the system can be a semi-closed aquaculture system. Such systems are usually land-based, with water exchange between the farm and a natural waterway. Thus, waste water can be released from the cages and/or ponds into the waterway, with replenishment using fresh water from the surrounding waterway.

More preferably, the aquaculture system can be a closed aquaculture system. Such systems can be land-based, such as within tanks, ponds raceways or the like. Preferably, the closed aquaculture system is a tank-based system, comprising one or a plurality of land-based tanks.

The tanks can be any conventional tanks that are used, or usable, in land-based fish farming. The tanks can for example be of generally round shape and of any convenient size. The tanks can alternatively be D-ended elongated tanks, or the tanks can be rectangular (sometimes referred to as "raceway" tanks). It can be especially preferable that the tanks be round with a flat or sloping bottom, with an overall volume that is in the range of 10 to 3000 $m^3$, 10 to 1000 $m^3$, more preferably 100 to 500 $m^3$, more preferably 100 to 400 $m^3$, more preferably 100 to 300 $m^3$.

An advantage of land-based systems is that there is little or no interference from surrounding waterways, due to tight control of waste water. As a consequence, there is little risk of fish escape from the system, which is a major concern with open systems.

Thus, a closed aquaculture system, in the present context, is a system of fish production that creates a controlled interface between the culture (fish) and the surrounding environment. In general, whether sited on water or land, closed aquaculture systems can:

eliminate or significantly reduce water pollution from feed, feces and chemical waste;

eliminate escapes from the rearing;

eliminate marine mammal deaths due to interactions with farmed fish and nets;

eliminate or greatly reduce the risk of disease and parasite transfer to wild salmon; and significantly reduce the need for antibiotics and chemical treatments in raising fish.

The aquaculture system can be a recirculating aquaculture system (RAS). A RAS is a series of culture tanks and filters where water is continuously recycled and monitored to keep optimal conditions year round. To prevent the deterioration of water quality, the water is treated mechanically through the removal of particulate matter and biologically through the conversion of harmful accumulated chemicals into non-toxic ones.

The aquaculture system can alternatively be a continuous flow system with a continuous flow of aqueous medium through the tank. Continuous flow systems can be flow-through systems, in which there is a continuous flow of water through the tank, i.e. the tank contains at least one water inlet for receiving fresh water, and at least one water outlet, through which water is released from the tank.

Other treatments such as ultraviolet sterilization, ozonation, and oxygen injection are also used to maintain optimal water quality. Through this system, many of the environmental drawbacks of aquaculture are minimized including escaped fish, water usage, and the introduction of pollutants. The practices also increased feed-use efficiency growth by providing optimum water quality.

The life-cycle stages can be considered to represent seasonal variations that salmon would experience in the wild. Thus, the first life-cycle stage can be considered to represent a summer stage, and the period that follows the first life-cycle stage can be considered to represent a winter stage, followed by a summer stage. Finally, the last (holding) stage can be considered a winter stage.

In salmon, like other fish, melatonin rhythms are believed to at least partially control the temporal coordination of many physiological processes, such as smoltification and reproduction. Salmon is sensitive to light, with the light intensity threshold for perception believed to be as low as 0.012 to 0.016 W/m$^2$ (LeClerqc et al. Aquacult Eng. 44, 35-47 (2011), Migaud et al. J. Pineal Res 41:42-52 (2006)). By contrast, light intensity from direct sunlight at the surface of the earth when the sun is at the zenith is about 1030 W/m$^2$. However, since the light intensity from sunlight has extreme diurnal variation, and there are large geographical variations, the average radiation at the surface of the earth is about 340 W/m$^2$, and the seasonal variation in maximal daily radiation in northern Europe (England) ranges from about 200 in December to about 900 W/m$^2$ in June.

Seasonal variations are obviously a combination of decreased light intensity due to decreased hours of daily sunlight, and decreased radiation due to the sun's position. Animals such as salmon need to sense these changes. Salmon has developed a very sensitive seasonal sensor, and as a consequence the perception of what is a "day" is very different from what a typical human would perceive. Therefore, a switch from "day" to "night" in the present context requires low light levels, and consequently, a "summer" period can be characterized by rather low light intensity within each 24 hour cycle. By contrast, conditions should be kept very dark for the salmon to experience true "winter"-like conditions.

Simulated light conditions of winter and summer in the present context therefore represents conditions that salmon perceives as being winter or summer—which is predominantly determined by light conditions. Thus, the term "simulated summer light exposure" and "simulated winter light exposure" are intended to refer to a simulation of light exposure that the salmon will perceive as being conditions of summer or winter. The term therefore can include exposure to ambient light conditions of the corresponding season, i.e. ambient summer or ambient winter conditions. The rearing can, for any particular season, include exposure to corresponding ambient light conditions, simulated light conditions, or both, i.e. one or more period of ambient light exposure and one or more preceding or following period of simulated light conditions.

Accordingly, light exposure as defined herein is light having an intensity that can be percepted by salmon. Thus, light exposure can mean that the light intensity experienced by the salmon is at least about 0.010 W/m$^2$, at least about 0.012 W/m$^2$, at least about 0.014 W/m$^2$, at least about 0.016 W/m$^2$, at least about 0.018 W/m$^2$ or at least about 0.020 W/m$^2$.

Darkness (e.g., absence of light), by contrast, can be light levels that are below the perception levels of Atlantic salmon. Thus, darkness can be light intensity experienced by the salmon that is less than about 0.016 W/m$^2$, less than about 0.014 W/m$^2$, less than about 0.012 W/m$^2$, less than about 0.010 W/m$^2$, or less than about about 0.008 W/m$^2$.

In general, the light is natural and/or artificial light that comprises wavelengths in the visible range. The light can comprise certain wavelengths within the visible range. In other words, the light can comprise one or more ranges of wavelengths within the visible region.

In certain embodiments, light exposure experienced by the salmon is the average light exposure in every 24 hour cycle. This means that for example a light exposure of 0.020 W/m$^2$ for 12 hours, followed by complete darkness, results in an average light exposure of 0.010 W/m$^2$.

The light intensity can be the average of the intensity as determined at the top surface of the water medium (e.g., water tank). Alternatively, the light intensity can be the average of the intensity as determined at the bottom of the water medium (water tank). The light intensity can alternatively be the average measured within the water medium, including measurements in the water, at the top surface and/or at the bottom of the water medium.

It is generally believed that the optimal temperature for salmon in the wild is in the range of about 12° C. to 15° C. Although the fish can tolerate higher temperature, such as up to 20° C., at least for short periods of time, other factors lead to increased mortality at higher temperatures. These include reduced fecundity, decreased egg survival, retarded growth of fry and smolts, reduced rearing densities, increased susceptibility to disease and decreased ability of young salmon and trout to compete with other species for food and to avoid predation. There is also a lower limit to the temperature at which salmon is viable, in particular for the adult fish—eggs, alevin and early fry can tolerate water temperatures close to 0° C.

The present inventors have discovered that the combination of temperature and time is a critical factor for egg development, viability and stability. Thus, as illustrated by the illustrative Examples provided herein, if the Accumulated Thermal Unit (ATU) during the combined winter-summer period that can follow maturation of smolt during a simulated summer, exceeds an upper value, the viability and stability of the eggs rapidly deteriorates. Accordingly, the ATU of the period is preferably less than about 5,000 units, more preferably less than about 4,800 units, more preferably less than about 4,600 units, more preferably less than about 4,400 units and more preferably less than about 4,200 units. Even more preferably, the ATU of the period is less than about 4,100 units.

In certain embodiments, the total ATU during the winter-summer period is in the range of about 2,000 to 5,000 ATU, such as in the range of about 2,000 to 4,500 ATU, such as in the range of about 2,000 to 4,000 ATU, such as in the range of about, 2,500 to 3,500 ATU, such as in the range of about 3,000 to 3,500 ATU, such as in the range of about 2,500 to 3,100 ATU.

To ensure that the eggs have reached a certain size and to ensure viability, the ATU during the period is preferably at least 2,000 units, more preferably at least 2,100 units, more preferably at least 2,200 units, more preferably at least 2,300 units, more preferably at least 2,400 units, and even more preferably at least 2,500 units.

Accordingly, the ATU range within the period that follows the first life-cycle period can be in the range of about 2,000 to 5,000 units, in the range of about 2,100 to 4,800 units, in the range of about 2,200 to 4,600 units, in the range of about 2.300 to 4,500 units, in the range of about 2,400 to 4,300 units, in the range of about 2,500 to 4,200 units, in the range of about 2,500 to 4,200 units, in the range of about 2,000 to 4,500 units, in the range of about 2,000 to 4,000 units, in the range of about 2,500 to 3,500 units, in the range of about 3,000 to 3,500 units, in the range of about 2,500 to 3,100 units.

The winter life-cycle component of the winter-summer period can comprise a total ATU of about 1,600 to 3,500 units, such as about 1,800 to 3,200 units, such as about 2,000 to 3,000 units, such as about 2,000 to 2,800 units, such as about 2,000 to 2,600 units, such as about 2,000 to 2,400 units.

The winter can range in time from 8 to 50 weeks, from 10 to 50 weeks, from 15 to 50 weeks, such as 16 to 50 weeks, such as 18 to 45 weeks, such as 20 to 40 weeks, such as 25 to 35 weeks, such as 28 to 34 weeks, such as 30 to 32 weeks.

The summer life-cycle component of the winter-summer period can comprise a total ATU of about 400 to 1,500 units, such as about 500 to 1,300 units, such as about 600 to 1,200 units, such as about 700 to 1,100 units, such as about 800 to 1,000 units.

The summer life-cycle of the winter-summer period can generally be in the range of about 6 to 20 weeks, in the range of about 8 to 20 weeks, in the range of about 10 to 18 weeks, in the range of about 12 to 16 weeks, in the range of about 13 to 15 weeks, or about 14 weeks.

The smoltification process develops a mechanism for salmon to fight the osmotic pressure caused by sea water. The average salinity (total dissolved salt) in seawater is about 35,000 ppm (equals 3.5% or 35 g/L), whereas fish plasma has a salinity of about 10,000 ppm. Salmon therefore fights against a gradient of about 25,000 ppm.

The salinity of the medium in accordance with the invention can in general be in the range of 0 to 35,000 ppm, i.e. the medium can represent seawater, fresh water (non-saline), or water with a salinity that is between fresh water and seawater For example, it can be preferable to maintain a lower salinity, such as about 0 to 30.000 ppm, about 0 to 28.000 ppm, or 0 to 26,000 ppm. In some embodiments, the salinity is in the range of about 10,000 ppm to about 35,000 ppm, about 20,000 ppm to about 35,000 ppm, about 20,000 ppm to about 30,000 ppm, such as about 22,000 ppm to about 28,000 ppm, about 24.000 ppm to about 28,000 ppm, about 24,000 ppm to about 26,000 ppm, or about 26,000 ppm in any of the life-cycle stages. The winter-summer period can be carried in an aqueous environment of any desired salinity. In some embodiments, the salinity is in the range of about 26,000 ppm to about 35,000 ppm.

One or more of the life-cycle stages can be performed in water that has low salinity. Such water has in general a salinity of less than 5,000 ppm, more preferably less than 3,000 ppm, more preferably less than 2.000 ppm, even more preferably less than 1,000 ppm. It can in particular be preferable that the water medium during the holding stage be of low salinity.

The stocking density of the salmon in the process (the amount of salmon per unit volume in the medium) can preferably be in the range of 10 to 100 kg/m$^3$, 10 to 50 kg/m3, 10 to 35 kg/m$^3$, or 10 to 30 kg/m$^3$, 15 to 30 kg/m$^3$, 20 to 30 kg/m$^3$, 25 to 30 kg/m$^3$, or about 15 kg/m$^3$, about 20 kg/m, about 25 kg/m or about 30 kg/m$^3$. It can be preferable that the stocking density be less than 30 kg/m$^3$, less than 25 kg/m$^3$, less than 20 kg/m$^3$, or less than 15 kg/m$^3$.

The salmon can be fed conventional feed during the rearing, such as pellets made of fishmeal or fish oil. The feed can preferably include additional ingredients such as vegetable meal, vegetable extracts (cereal, bean, soy, etc.), vitamins, mineral salts, and astaxanthin.

Eggs that are obtained by the process in accordance with the invention have the advantage of being large in size, having a high viability. The eggs on average can be at least 3 mm in diameter, more preferably at least 4 mm in diameter, even more preferably at least 5 mm or at least 5.5 mm in diameter. The eggs can on average be in the range of 3 to 10 mm in diameter, preferably about 3 to 9 mm, more preferably about 4 to 8 mm or about 5 to 7 mm in diameter or about 5.5 to 6.5 mm in diameter.

Egg size is sometimes estimated from the number of eggs per volume that the eggs occupy. Thus, if there are 6,000 eggs in a liter of volume, the average egg size is about 5.8 mm. Egg size is inversely proportional to the number of eggs per volume. Accordingly, the eggs that are produced in accordance with the invention can preferably have an average size so that there is in the range of 2,000 to 10,000 eggs per liter volume, such as in the range of 3,000 to 10,000 eggs per liter volume, such as in the range of 4,000 to 9,000 eggs per liter volume, such as in the range of 4,000 to 8,000 eggs per liter volume, such as in the range of 5,000 to 8,000 eggs per liter volume, such as in the range of 5,500 to 7,000 eggs per liter volume.

Viability of eggs can be determined as the percentage of eggs that reach a certain developmental phase. For example, viability can be measured as the percentage of eggs that develop into a hatched embryo. The viability can alternatively be measured as the percentage of eggs that reach the visible eye stage of development, which is the stage at which the dark eyes are visible through the egg membrane (occurs on average after 20 to 50 days in the wild).

The eggs that are obtained by the process of the invention have a high likelihood of developing normally and result in a healthy embryo. Thus, the viability to the visible eyed stage ("eyed eggs") can be at least about 40%, at least about 50%, at least about 60%, at least about 70%, or at least about 80%. The viability to the eyed stage can also be in the range of about 40% to about 90%, about 40% to about 80%, about 50% to about 80%, about 60% to about 80%, or about 70% to about 80%.

Eggs that are harvested in accordance with the invention preferably have a survival to the eyed stage that at least 40%. Preferably, however, the eggs have a higher survival to the eyed stage, such as survival that is at least 50%, at least 60%, at least 70% or at least 80%. The eggs can have a survival that is in the range of about 40% to about 90%, such as about 50% to about 80%, or about 60% to about 80%.

Furthermore, the process allows for the production of eggs, irrespective of the season. By simultaneously controlling temperature and photocycle, it is possible to make adjustments so that spawning fish is available year-round, while at the same time observing the criteria of critical weight of the salmon at the end of the first life-cycle following smoltification (first summer), and keeping ATU for the following period that includes at least one winter period, followed by a summer period, within the range that results in optimal egg production.

For example the temperature within any one of the life-cycle stages can be adjusted to increase/decrease growth rate. Preferably, however, the temperature in any life-cycle stage is no higher than about 15° C., the optimal growth temperature for Atlantic salmon. In general, however, the temperature within any life-cycle period can be in the range of about 2° C. to 18° C., in the range of about 1° C. to 15° C., in the range of about 3° C. to 15° C., in the range of about 5° C. to 14° C., in the range of about 6° C. to 14° C., in the range of about 7° C. to 14° C., in the range of about 8° C. to 14° C., in the range of about 8° C. to 12° C., in the range of about 9° C. to 11° C.

The temperature in the different life-cycles can be identical, or it can be different. It can be preferable to keep the temperature in the holding stage, where the mature salmon is waiting to spawn, lower than in previous life-cycle stages. Thus, the temperature in the holding stage can be selected to be in the range of about 1° C. to 8° C., 2° C. to 8'C, 3° C. to 8'C, such as about 4° C. to 6°, or about 5° C.

Fish that does not mature in a single round of winter-summer period that follows a first summer stage (e.g. fish that does not mature within the winter-summer period that follows a first life-cycle), can be subject to a second round of winter-summer, i.e. a second round of a winter-summer period. For this purpose, the salmon that has not matured is removed from the holding stage that follows the winter-summer period and returned to tanks where it will undergo a second round of winter-summer.

Accordingly, the process of the invention can include a further step of subjecting salmon that has not matured at time of the holding stage to a second round of a winter-summer period. After being subject to a second round of such a period, the salmon is moved to a holding stage for spawning.

Salmon that has not matured after such second round of the winter-summer period can be discarded or it can be used for other use, such as human consumption.

BRIEF DESCRIPTION OF THE DRAWINGS

The skilled person will understand that the drawings, described below, are for illustration purposes only. The drawings are not intended to limit the scope of the present teachings in any way.

Figure 1:
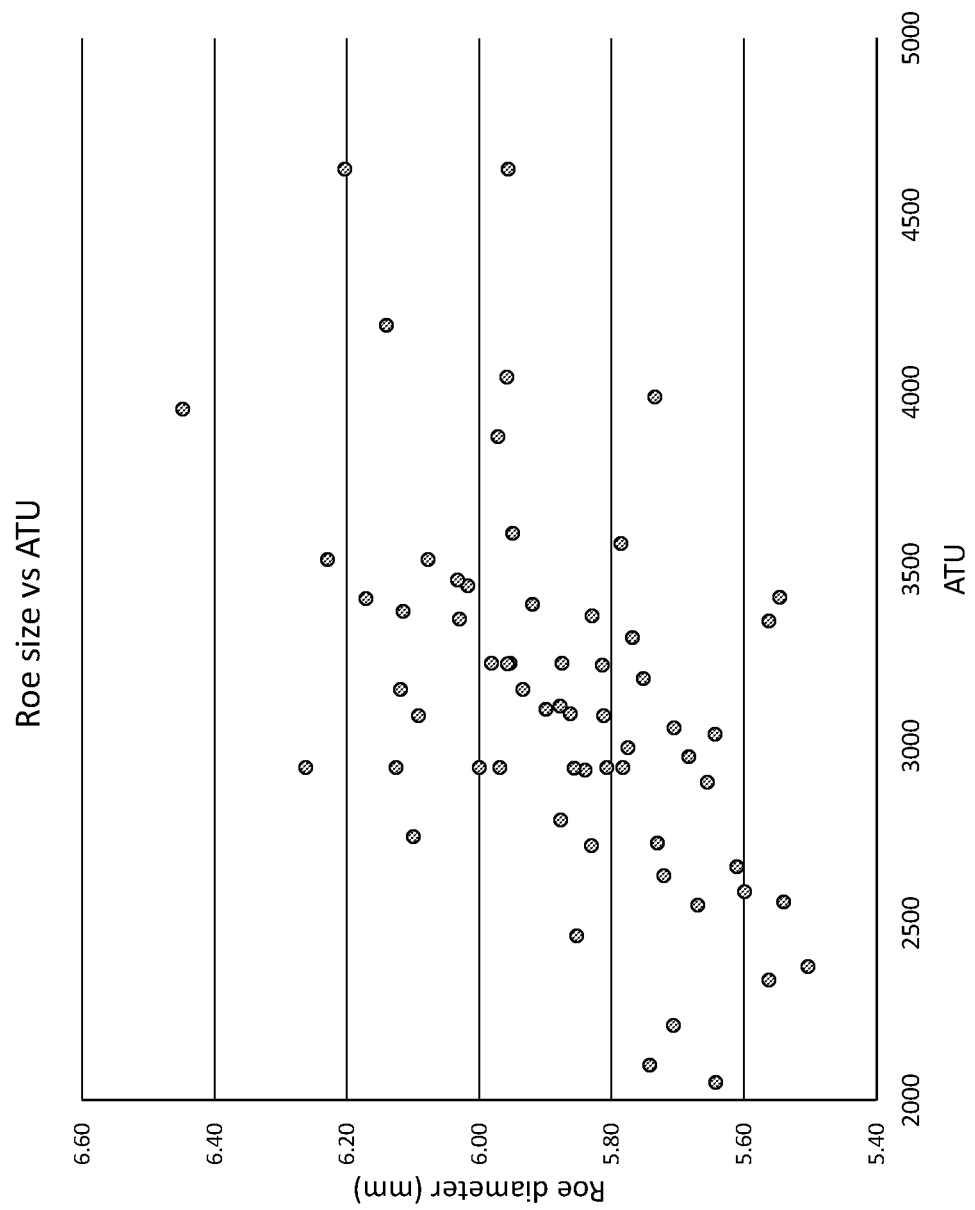
FIG. 1 shows changes in average roe size (diameter) as a function of Accumulated Thermal Units (ATU) during salmon rearing as described herein.

The above features along with additional details of the invention, are described further in the examples below, which are intended to further illustrate the invention but are not intended to limit its scope in any way.

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

The present invention relates to an improved process for the production and harvesting of fish eggs from Atlantic Salmon. The process is based on the optimization of certain parameters of the farming process, in particular the discovery that during a winter-summer period during the rearing the Accumulated Temperature Unit (ATU) that the adult salmon is exposed to should be within a certain range for optimal egg production and quality.

During the winter-summer period, development of eggs in the ovaries takes place, and the conditions during this maturation phase is therefore important for the production of healthy, viable eggs. If the salmon is allowed to grow and develop for too long (ATU during the simulated winter/summer following an extended summer period is over a certain limit), the eggs are not viable. It has thus been found, as exemplified in the below examples, that egg quality improves with ATU up to a certain point, while at very high ATU, the quality of eggs (size, mortality) deteriorates.

EXAMPLES

The following, non-limiting experimental examples describe findings that illustrate certain benefits of the invention.

Smoltified atlantic salmon was reared under summer conditions (exposure to light, provided by indoor fluorescent lighting, typically 22 hours in every 24 hour cycle) and subsequently moved to 300 m³ tanks at an average weight of approximately 4 kg. The rearing tanks were land-based and within houses with no possibility of sunlight to penetrate into the houses. Following transfer, the fish were put on winter period with photoperiod, salinity and temperature as described in the above. Typically, light exposure during winter was about 8 hours in each 24 hour cycle, water temperature in the range of 10-12° C. and salinity close to, or slightly lower than that of seawater (typically within about 26-35 g/L). The fish were fed to satisfaction during the winter period. At the completion of the winter period where a proportion of fish had proceeded to sexual maturation, the onset of summer was set in the tanks/house for a given period of light (exposure to light typically 22 hours in every 24 hour cycle), temperature (about 10-12° C.) and salinity as described above. At the completion of the summer period the onset of winter was set as described above with the photoperiod, temperature and salinity to finalize the process of spawning until the mature eggs were removed (harvested) from each female.

Example 1

Strains of *Salmo Salar* were reared in closed fresh water tanks in Kollafjordur, Iceland.

Following smoltification, the smolt were subsequently reared at two locations, Kalmanstjorn and Vogavik (Iceland). The rearing was performed in circulating land-based tanks, using water from the surrounding area.

Each group contained initially on average of about 2000 smolted fish, reared in two tanks, and the results are indicated for the average of each group.

During rearing, parameters (temperature and time) during the first simulated winter period that follows smoltification were varied, while keeping other conditions relatively constant for subsequent simulated summer and winter, until the eggs were harvested.

Figure 2:
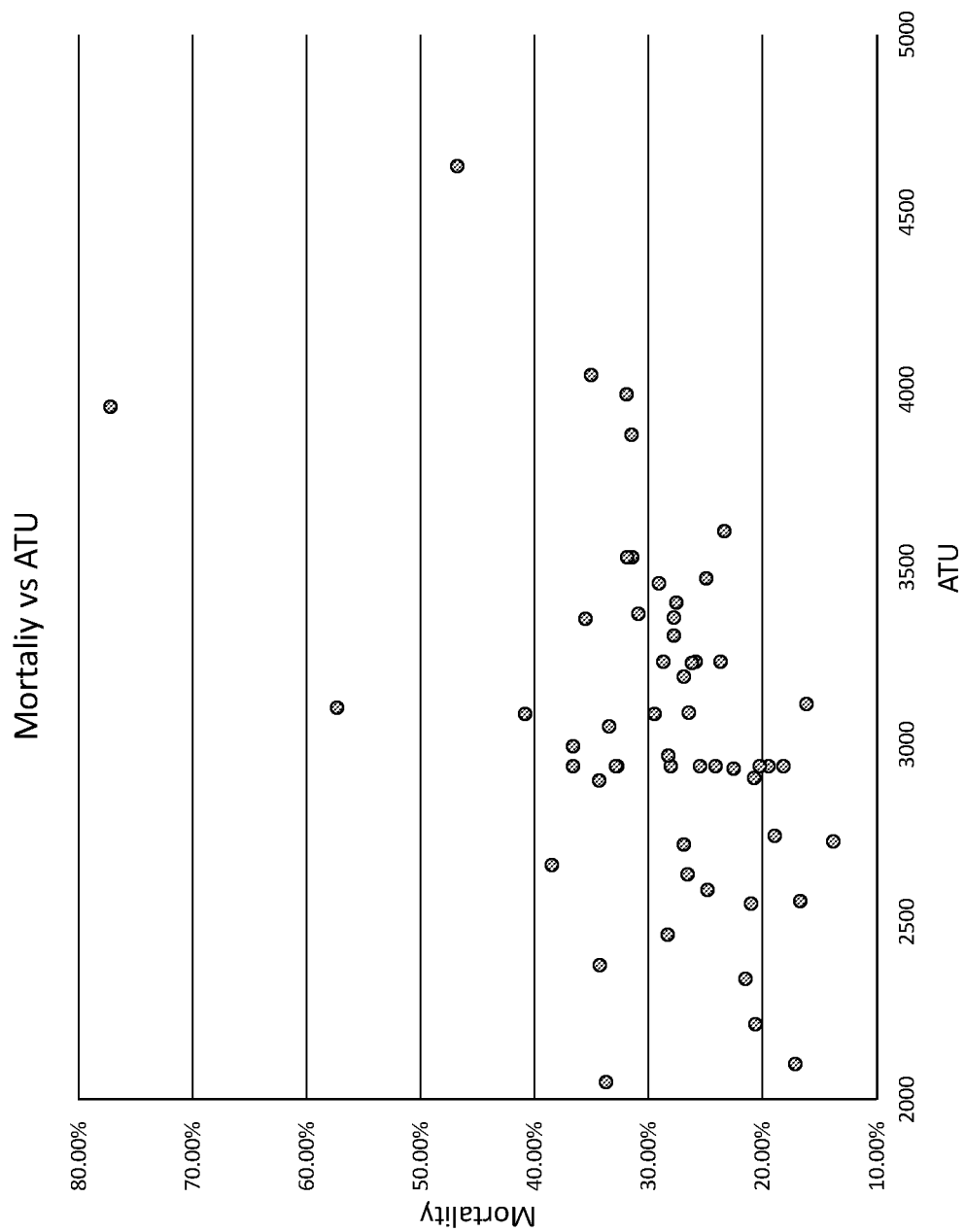
FIG. 2 shows changes in average roe mortality (eyed stage) as a function of Accumulated Thermal Units (ATU) during salmon rearing as described herein.

As can be seen in FIG. 1, there is a clear and strong correlation between average roe size and ATU, up to about 4000 ATU. There is however only a subtle increase in average roe mortality in this ATU range, as illustrated in FIG. 2.

At very high ATU however, average roe size levels off. Simultaneously, the mortality of the roe rises, indicating that there is an upper limit to the ATU for obtaining high quality roe.

These experiments illustrate that for optimal roe harvest that combines high roe quality (size) and low mortality, the ATU should be maintained within a certain range. It is particularly important to avoid very high ATU, since roe quality deteriorates sharply at very high ATU.

Example 3

A total of 46 groups of salmon reared at two stations in Iceland (Kalmanstjorn and Vogavik) were analysed for egg size and mortality, including a total of 324 batches.

Rearing conditions were as described under Example 1. The salmon was smoltified and subsequently reared to an average size of about 4 kg per fish under simulated summer conditions (average of about 22 hours light exposure in every 24 hours) before commencing the winter-summer period, during which the average light exposure was about 8 hours (winter) and 22 hours (summer), respectively.

Mortality was assessed at the eyed stage (average at incubation period of ATU of the eggs). Egg size was determined as the total number of eggs per liter of volume.

A total of 238 million eggs were analysed. Data were analyzed using the RStudio program. Normality and homogeneity of variance was determined by Shapiro-Wilk test ($P>0.05$). After accepting the normal distribution of the data, one-way ANOVA was used to test significance of differences in mortality of the groups at the different UTAs. The Tukey test was used for all post-hoc comparisons. Correlation was

TABLE 1

Summary of salmon rearing batches.

| Group | Winter 1 ATU | Winter 1 Weeks | Summer 1 ATU | Summer 1 Weeks | Winter 2 Weeks | Weight entering Winter 1 | Percentage maturation | Weight when harvested (kg) | Roe concentration (count/L) | Roe diameter (mm) | Roe mortality | Total ATU | Total Weeks |
|---|---|---|---|---|---|---|---|---|---|---|---|---|---|
| K11-2b1 | 1330 | 20 | 882 | 12 | 10 | 5 | 61% | 9.5 | 6.577 | 5.71 | 20.7% | 2212 | 42 |
| V11-1a1 | 1764 | 28 | 870 | 12 | 11 | 4.4 | 73% | 8.1 | 6.528 | 5.72 | 26.65% | 2634 | 51 |
| V11-1b1 | 2382 | 41 | 670 | 12 | 10 | 4.4 | 88% | 10 | 6.580 | 5.71 | 33.56% | 3052 | 63 |
| V12-1a2 | 2424 | 38 | 935 | 12 | 9 | 8.5 | 79% | 12.3 | 5.573 | 6.03 | 27.87% | 3359 | 59 |
| K12-1b1 | 2719 | 37 | 882 | 12 | 10 | 4.8 | 50% | 9.5 | 5.802 | 5.95 | 23.41% | 3601 | 59 |
| K11-1b1 | 3160 | 43 | 882 | 12 | 8 | 5 | 97% | 9 | 5.777 | 5.96 | 35.10% | 4042 | 63 |
| K11-1c1 | 4116 | 56 | 514 | 7 | 0 | 5 | 86% | 9 | 5.783 | 5.96 | 46.85% | 4630 | 63 |

Results are summarized in Table 1. As can be seen, at very high ATU, roe mortality increases rather sharply, which negates the increase in roe size that is apparent with increased ATU.

Example 2

To further investigate the effects of ATU on roe quality, results from rearing of a total of 62 groups of *Salmo Salar*, obtained over a period of several years, were analysed. The groups were reared under conditions as described above. Based on measurements of the number of roe per unit volume (L), the average roe diameter was calculated, assuming the roe were spherical of uniform size.

analyzed by a cubic polynomial regression (linear regression). The resulting data are shown in FIGS. 5-8.

Results

Figure 3:
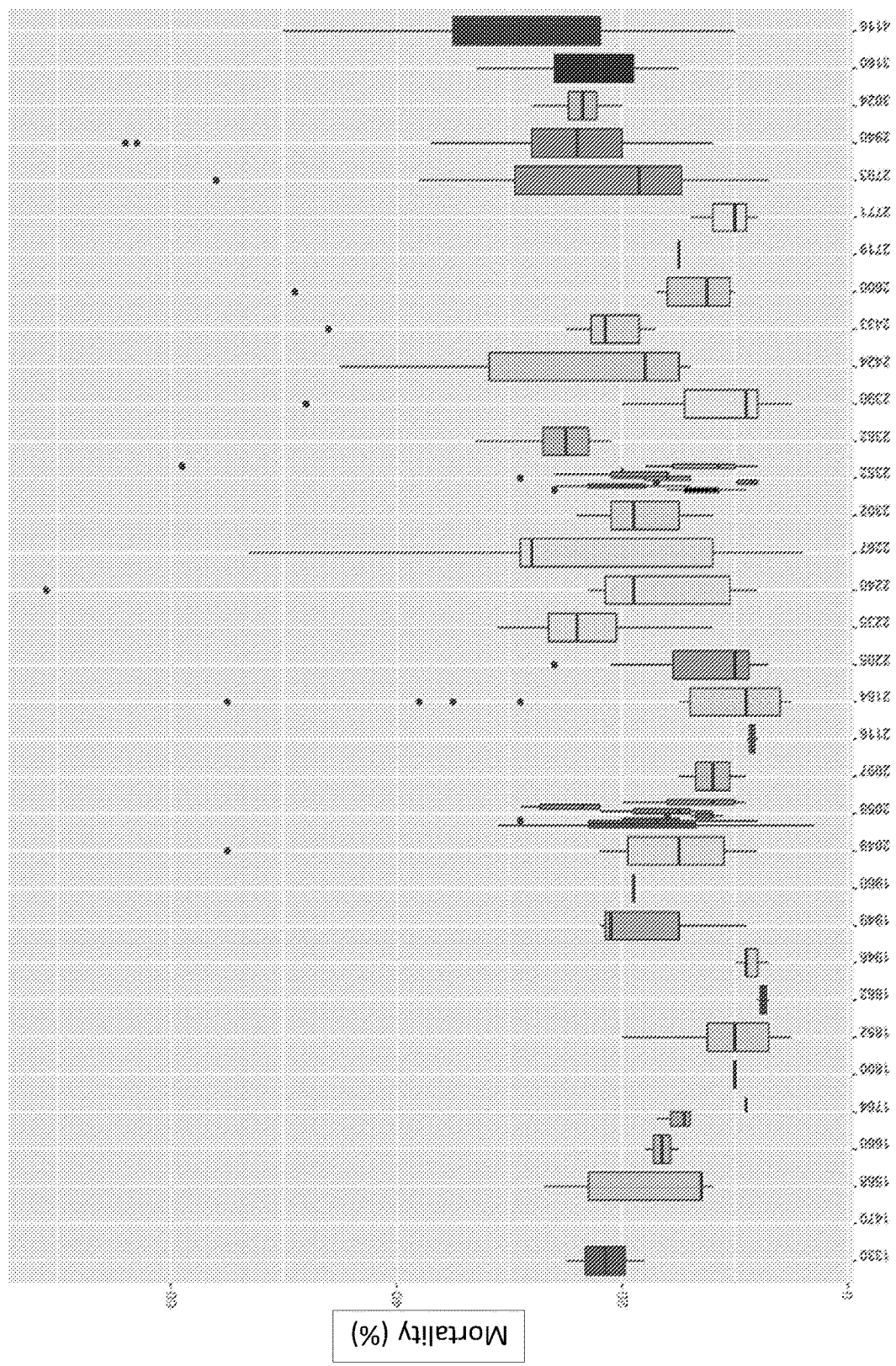
FIG. 3 shows egg mortality as a function of ATU during the winter life-cycle of the winter-summer period for different groups of *Salmo salar*.

In FIG. 3, mortality as a function of ATU during the winter life-cycle of the winter-summer period is shown. There is a clear decline in mortality between about 1,800 and 2,200 ATU, below and above which the mortality increases. This suggests an important contribution of the winter life-cycle to the total ATU effect during the winter-summer period.

Figure 4:
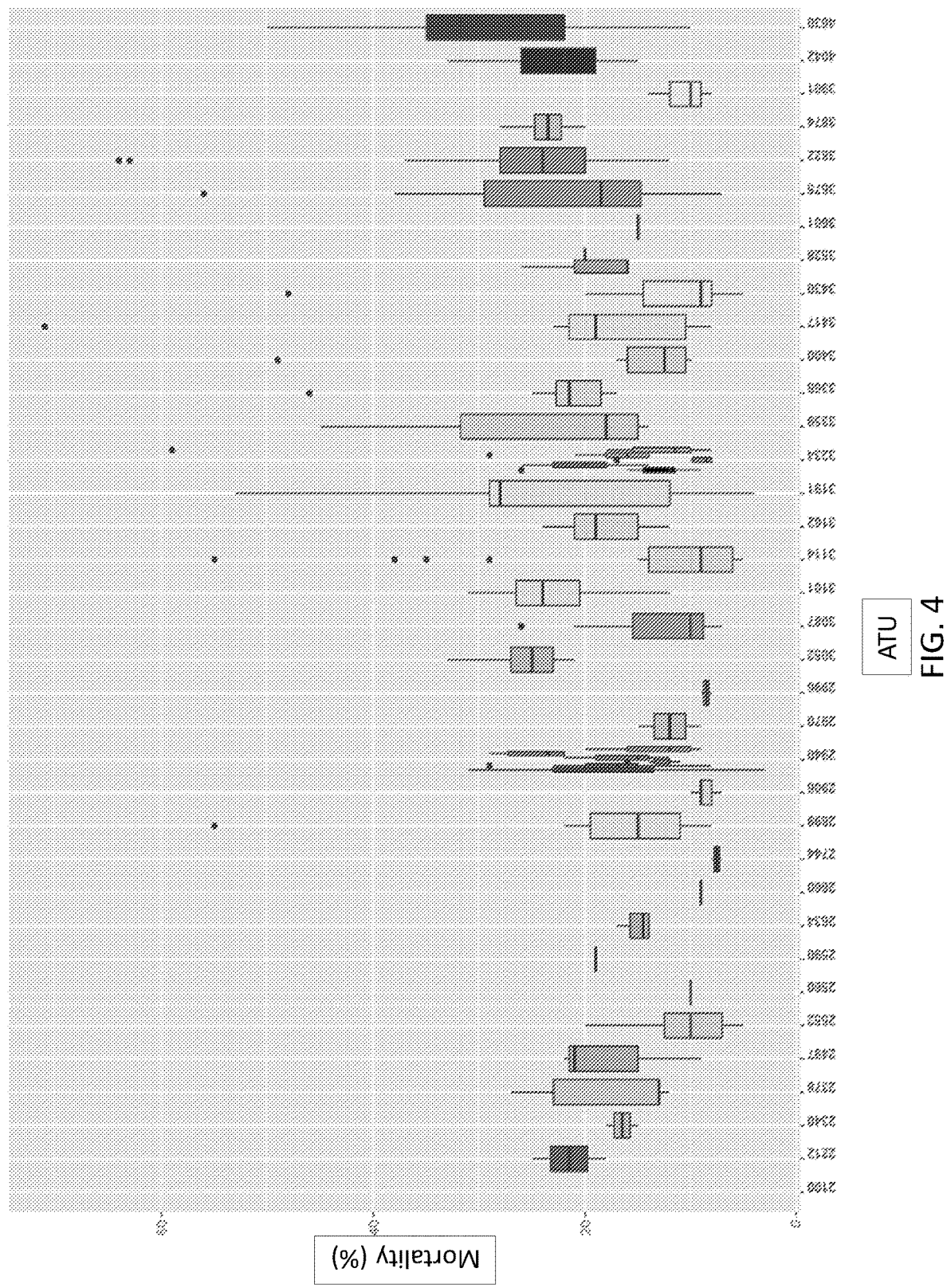
FIG. 4 shows egg mortality as a function of total ATU during the winter-summer period for different groups of *Salmo salar*.

FIG. 4 shows the mortality for the total winter-summer period. There is a decrease in mortality between about 2,500 ATU and 3,100 ATU, with increased mortality observed below and above this range.

Figure 5:
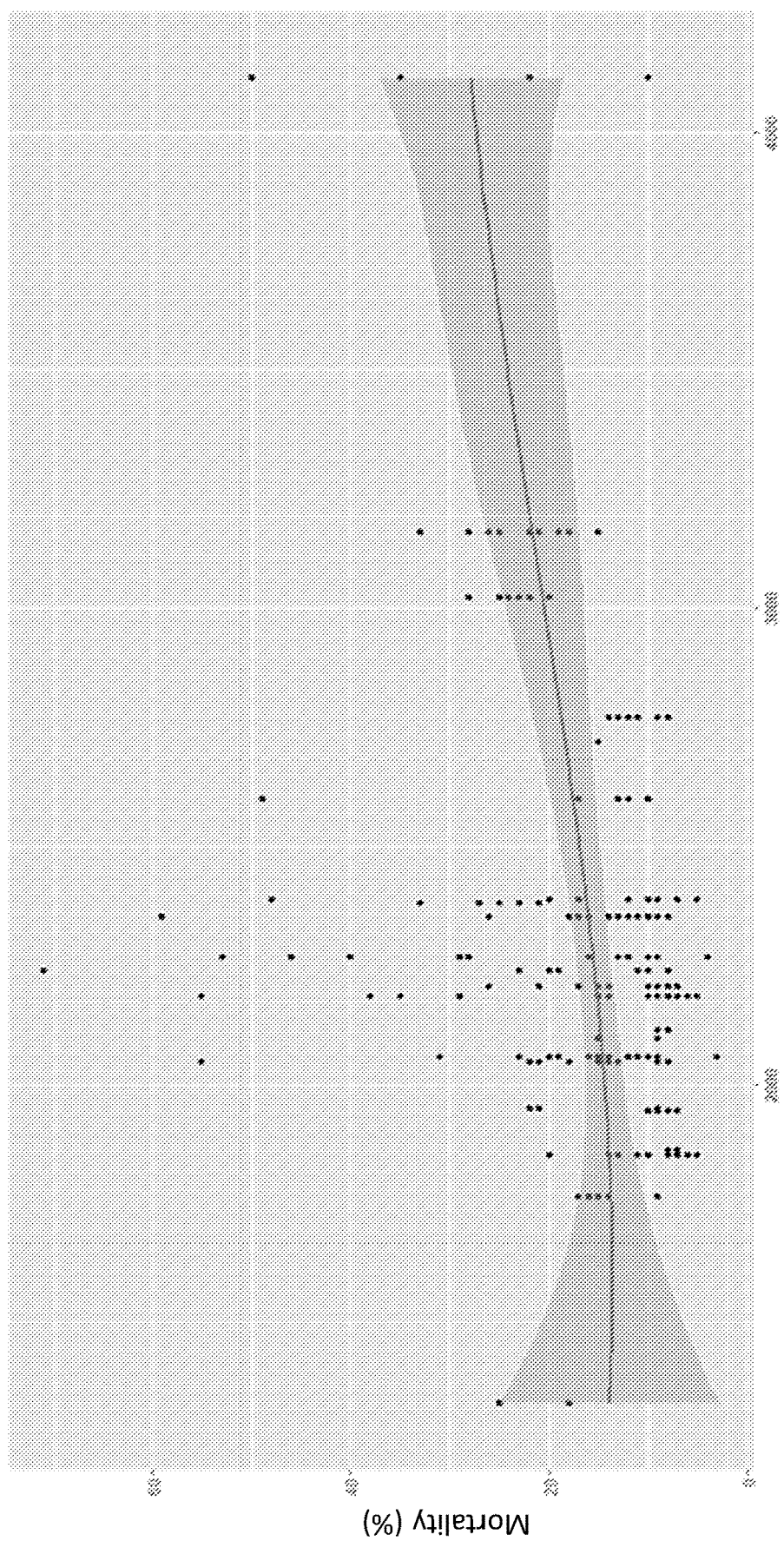
FIG. 5 shows egg mortality as a function of ATU during the winter life-cycle of the winter-summer period for different groups of *Salmo salar*.
Figure 6:
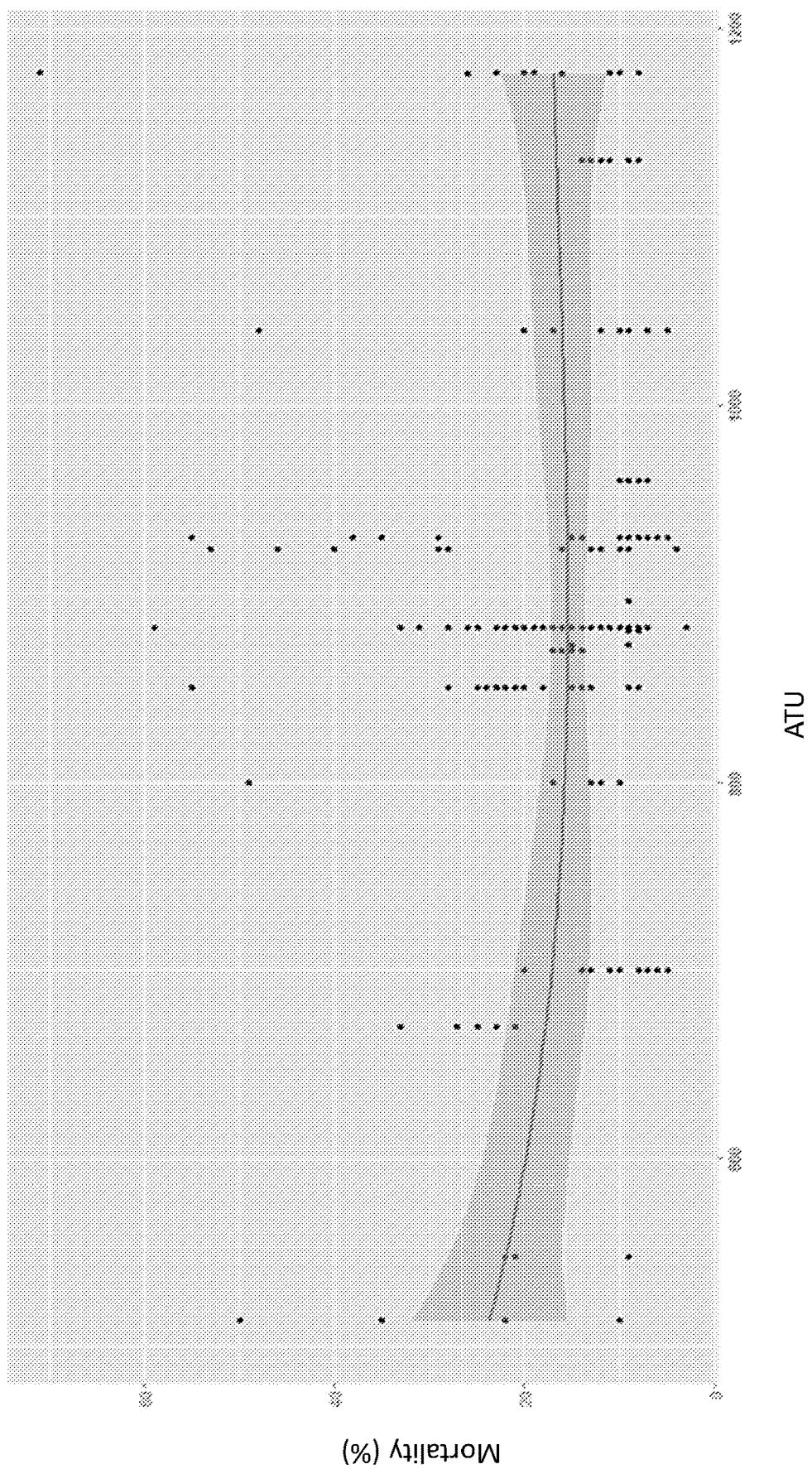
FIG. 6 shows egg mortality as a function of ATU during the summer life-cycle of the winter-summer period for different groups of *Salmo salar*.
Figure 7:
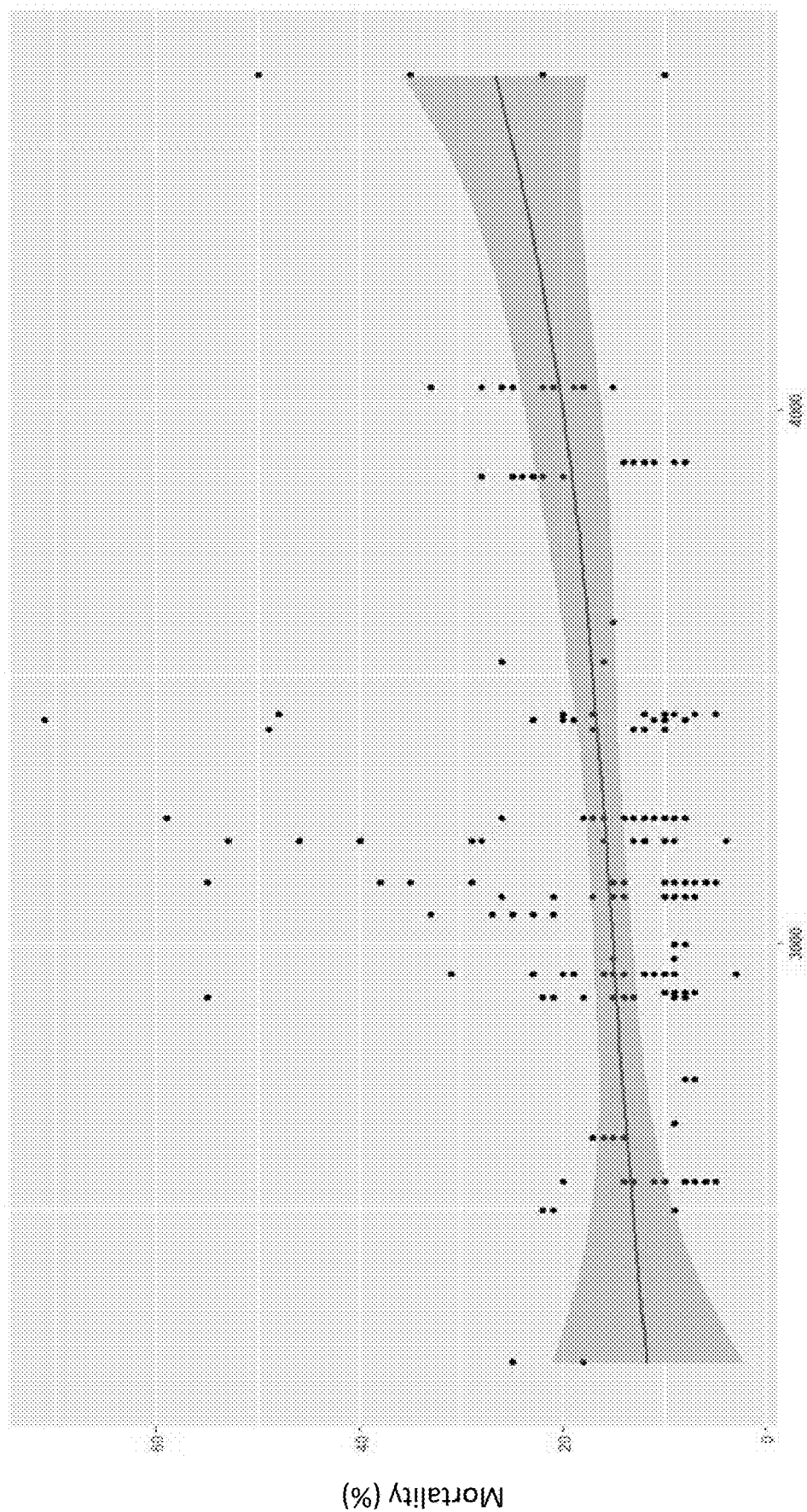
FIG. 7 shows egg mortality as a function of total ATU during the winter-summer period for different groups of *Salmo salar*.

In FIGS. 5-7, the data is shown together with results on non-linear regression analysis, with the gray area indicating 95% confidence intervals. The data in FIG. 5 shows a clear increase in mortality with increased ATU for the winter life-cycle of the winter-summer period, in particular above about 2,600 ATU. The ATU effect during the summer life-cycle (see FIG. 6) is less dramatic, the main effect being observed at ATU of less than about 800 ATU. The total effect is shown in FIG. 7, which shows a steady increase in mortality, in particular above about 3,500 ATU and in particular the mortality increases dramatically above about 4,000 ATU.

Figure 8:
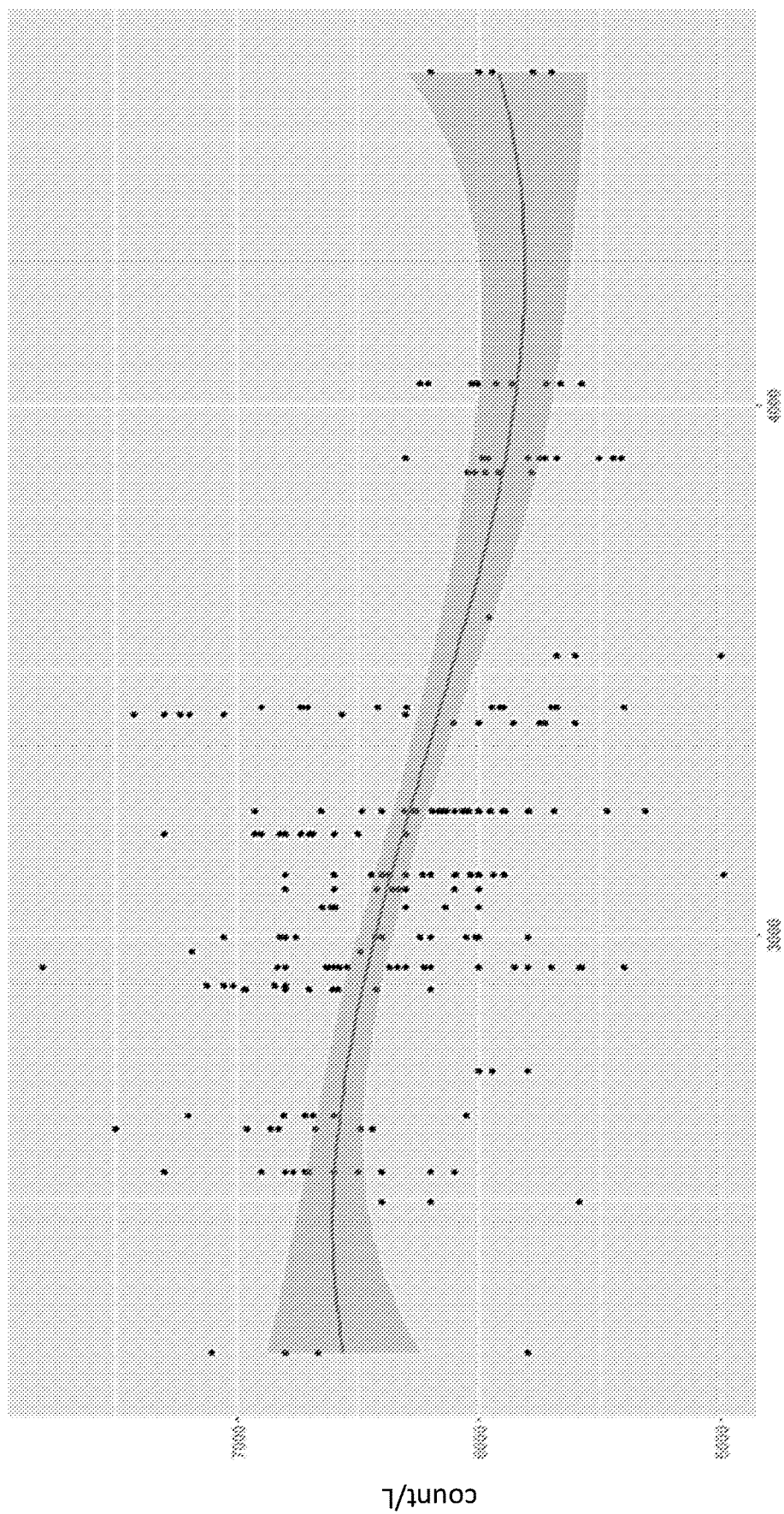
FIG. 8 shows average egg size (in units of eggs/L volume) during the winter-summer period for different groups of *Salmo salar*.

The corresponding effect on egg size is shown in FIG. 8, where egg size is shown as number of eggs per liter of volume. As expected, there is an increase in average egg size with rearing time (increased ATU), but only up to a limit; thus the effect levels off around 4,000 ATU, with no increase and even decrease above this limit—an indication of increasingly poor egg viability.

These results clearly show that there is an ATU range of the winter-summer period of the rearing of salmon that results in production of salmon eggs with optimal quality (size and mortality).

EMBODIMENTS

Particular embodiments of the invention are set forth in the following clauses:
1. A process for the harvesting of fish eggs, comprising:
    providing a broodstock comprising smoltified sexually immature fish from at least one *Salmo salar* strain;
    rearing the broodstock in an aquatic environment comprising an aqueous medium that is suitable for sustaining life of the broodstock such that it proceeds to maturation, wherein the rearing is performed in life-cycle stages, and wherein at least the light exposure and time span of each life cycle stage is adjusted, so that:
        in a first life-cycle stage, the broodstock is exposed to photo cycles that simulate summer light exposure, so that, at the end of the life-cycle stage, the average weight of the broodstock is at least 1 kg;
        in a period that follows the first life-cycle and that includes at least a second life-cycle stage, within which the broodstock is exposed to light that simulates winter light exposure, and a subsequent third life-cycle stage, within which the broodstock is exposed to light that simulates summer light exposure, the total Accumulated Thermal Unit (ATU) is no more than 5000;
        in a holding stage that follows all previous stages, the broodstock is exposed to photo cycles that simulate winter light exposure and maintained at those conditions until the broodstock has matured to spawning;
        and
    harvesting eggs from the mature fish.
2. The process of the preceding clause 1, wherein the broodstock, prior to the second life-cycle stage, has reached a weight that is about 2 kg or more, preferably about 3 kg or more, even more preferably about 4 kg or more.
3. The process of clause 1 or clause 2, wherein the broodstock has reached a weight of about 4 kg prior to the second life-cycle stage.
4. The process of any one of the preceding clauses 1-3, wherein simulated summer light conditions comprise exposure to light for at least 12 hours in each 24 hour period.
5. The process of any one of the preceding clauses 1-4, wherein simulated winter light conditions comprise exposure to light for less than 12 hours in each 24 hour period.
6. The process of any one of the preceding clauses 1-5, wherein the total ATU in the period that follows the first life-cycle is in the range of about 2,500 ATU to about 4,900 ATU, more preferably in the range of about 2,500 ATU to about 4,800 ATU, even more preferably in the range of about 2,800 ATU to about 4,600 ATU.
7. The process of any one of the preceding clauses 1-6, wherein the aqueous medium in any of the life-cycle stages has a salinity that is in the range of about 0 to about 35,000 ppm, such as is in the range of about 10,000 to about 35,000 ppm, such as is in the range of about 20,000 to about 35,000 ppm.
8. The process of the preceding clause 7, wherein the aqueous medium in any of the life-cycle stages has a salinity that is in the range of about 24,000 to about 28,000 ppm.
9. The process of any one of the preceding clauses 1-8, wherein the aquaculture environment comprises a recirculating aquaculture system.
10. The process of any one of the preceding clauses 1-9, wherein the aquaculture environment comprises a closed aquaculture system.
11. The process of any one of the preceding clauses 1-10, wherein the aquaculture environment is land based.
12. The process of the preceding clause 11, wherein the aquaculture environment comprises at least one flow-through tank.
13. The process of any one of the preceding two clauses 11-12, wherein the land-based environment comprises two or more tanks, and wherein fish that matures beyond the first life-cycle stage is subject to further maturation in at least a second tank that is different from the first tank.
14. The process of any one of the preceding two clauses 12-13, wherein the first life-cycle stage, the period that includes at least a second and third life-cycle stages, and the holding stage are each performed in separate tanks.
15. The process of any one of the preceding clauses 1-14, wherein the holding stage is performed in water medium that has a salinity that is less than 3,000 ppm.
16. The process of any one of the preceding clauses 1-15, wherein the closed environment comprises at least one sea-based cage.
17. The process of any one of the preceding clauses 1-16, wherein the water temperature in any of the life-cycle stages is maintained with a range of about 2 to about 18° C., preferably in the range of about 3° C. to about 15° C.
18. The process of any one of the preceding clauses 1-17, wherein the period of the first stage is at least 8 weeks.
19. The process of any one of the preceding clauses 1-18, wherein the period of the second stage is at least 5 weeks.
20. The process of any one of the preceding clauses 1-19, wherein the period of the third stage is at least 2 weeks.
21. The process of any one of the preceding clauses 1-20, wherein the period of the combined second and third stages is at least 7 weeks.

22. The process of any one of the preceding clauses 1-21, wherein the period of the holding stage is in the range of 5 to about 30 weeks.
23. The process of any one of the preceding clauses 1-22, wherein the exposure to light within each photocycle period is continuous.
24. The process of any one of the preceding clauses 1-23, wherein light exposure during simulated summer light exposure constitutes exposure of the aqueous medium to natural and/or artificial light in the visible range that, on average, is at least $0.010$ W/m$^2$, more preferably at least $0.012$ W/m$^2$, at least $0.014$ W/m$^2$, or at least $0.016$ W/m$^2$.
25. The process of any one of the preceding clauses 1-24, wherein the light exposure during during simulated winter light exposure constitutes exposure of the aqueous medium to natural and/or artificial light in the visible range that, on average, is less than $0.010$ W/m$^2$, preferably less than $0.005$ W/m$^2$, less than $0.004$ W/m$^2$, less than $0.003$ W/m$^2$, less than $0.002$ W/m$^2$ or less than $0.001$ W/m$^2$.
26. The process of any one of the preceding clauses 1-25, wherein the switch between light conditions of different stages is performed instantaneously.
27. The process of any one of the clauses 1 to 24, wherein the switch between light conditions of different stages is performed gradually.
28. The process of any one of the previous clause 27, wherein the switch between light condition is performed over a period of 1 day to 4 weeks.
29. The process of any one of the preceding clauses 1-28, wherein the harvested eggs have a survival to the eyed stage of at least 40%.
30. The process of any one of the preceding clauses 1-29, wherein the harvested eggs have a survival to the eyed stage of at least 50%.
31. The process of any one of the preceding clauses 1-30, wherein the harvested eggs have a survival to the eyed stage of at least 60%.
32. The process of any one of the preceding clauses 1-31, wherein the harvested eggs have a survival to the eyed stage of at least 70%.
33. The process of any one of the preceding clauses 1-32, wherein the harvested eggs have an average diameter of at least 3 mm, preferably at least 4 mm, even more preferably at least 5 mm.
34. Eggs from *Salmo salar* produced by a process as set forth in any one of the preceding clauses 1-33.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A process for the harvesting of fish eggs, comprising:
providing a broodstock comprising sexually immature fish from at least one *Salmo salar* strain;
rearing the broodstock in an aquatic environment comprising an aqueous medium that is suitable for sustaining life of the broodstock such that it proceeds to maturation, wherein the rearing is performed in life-cycle stages during which at least light exposure and time span of each life-cycle stage is adjusted, wherein the rearing includes at least a winter-summer period that comprises a winter life-cycle stage, within which the broodstock is exposed to light that simulates winter light exposure, and a subsequent summer life-cycle stage, within which the broodstock is exposed to light that simulates summer light exposure, wherein a total Accumulated Thermal Unit (ATU) during the winter-summer period is no more than 5000; and
harvesting eggs from mature fish,
wherein the winter life-cycle stage of the winter-summer period comprises a total ATU of 1,600 to 3,500 units, and the summer life-cycle stage of the winter-summer period comprises a total ATU of 400 to 1,500 units,
wherein the winter life-cycle stage includes light exposure for less than 12 hours in every 24 hour cycle, and the summer life-cycle stage includes light exposure for at least 12 hours in every 24 hour cycle,
wherein during the winter-summer period, the summer life-cycle stage immediately follows the winter life-cycle stage, and
wherein prior to the winter-summer period, the broodstock has been smoltified.

2. The process of claim 1, wherein the rearing comprises at least one further summer life-cycle stage that precedes the winter-summer period.

3. The process of claim 1, wherein the rearing comprises at least one further winter life-cycle stage that precedes at least one further summer life-cycle stage, and wherein any two such further winter life-cycle stages, when present, are bridged by the summer life-cycle stage.

4. The process of claim 1, wherein prior to the winter-summer period, the broodstock has been allowed to grow such that an average weight of the broodstock is at least 50 g per fish.

5. The process of claim 1, wherein prior to the harvesting, the fish are maintained in a holding stage during which the fish are exposed to winter light exposure until the fish have matured to spawning.

6. The process of claim 1, wherein simulated summer light exposure comprises simulating ambient light conditions during summer, and wherein simulated winter light exposure comprises simulating ambient light conditions during winter.

7. The process of claim 1, wherein the light exposure within each life-cycle stage is continuous.

8. The process of claim 1, wherein the light exposure constitutes exposure of the aqueous medium to natural and/or artificial light in a visible range that, on average, is at least 0.010 W/m$^2$.

9. The process of claim 1, wherein a switch between light conditions, from light to dark or vice versa, within life-cycle stages is performed instantaneously.

10. The process of claim 1 wherein a switch between light conditions, from light to dark or vice versa, within life-cycle stages is performed over a period of at least 1 day.

11. The process of claim 1, wherein a switch between light conditions, from light to dark or vice versa, within life-cycle stages is performed over a period that is in the range of 1 day to 4 weeks.

12. The process of claim 1, wherein the total ATU during the winter-summer period is in the range of 2,500 ATU to 4,900 ATU.

13. The process of claim 1, wherein the aqueous medium in any of the life-cycle stages has a salinity that is in the range of 0 to 35,000 ppm.

14. The process of claim 1, wherein the aquatic environment comprises a recirculating aquaculture system.

15. The process of claim 1, wherein the aquatic environment comprises a closed aquaculture system.

16. The process of claim 1, wherein the aquatic environment is land-based.

17. The process of claim 5, wherein the holding stage is performed in a holding stage aqueous medium that has a salinity that is less than 3,000 ppm.

18. The process of claim 1, wherein a water temperature in any of the life-cycle stages is maintained with a range of 1° C. to 18° C.

19. The process of claim 1, wherein a water temperature during the winter-summer period is in a range of 8° C. to 15° C.

20. The process of claim 1, wherein the winter-summer period is in the range of 40 to 50 weeks.

21. The process of claim 1, wherein the winter life-cycle stage of the winter-summer period is in the range of 16 to 50 weeks.

22. The process of claim 1, wherein the summer life-cycle stage of the winter-summer period is in the range of 6 to 20 weeks.

23. The process of claim 5, wherein a period of the holding stage is in the range of 5 to 30 weeks.

24. The process of claim 1, wherein the harvested eggs have a survival rate to an eyed stage of at least 40%.

25. The process of claim 1, wherein the harvested eggs have an average diameter of at least 3 mm.

26. A process of rearing *Salmo salar*, comprising:
providing a broodstock comprising sexually immature fish from at least one *Salmo salar* strain; and
rearing the broodstock in an aquatic environment comprising an aqueous medium that is suitable for sustaining life of the broodstock such that it proceeds to maturation, wherein the rearing is performed in life-cycle stages during which at least light exposure and time span of each life-cycle stage is adjusted, wherein the rearing includes at least a winter-summer period that comprises a winter life-cycle stage, within which the broodstock is exposed to light that simulates winter light exposure, and a subsequent summer life-cycle stage, within which the broodstock is exposed to light that simulates summer light exposure, wherein a total Accumulated Thermal Unit (ATU) during the winter-summer period is no more than 5000,
wherein the winter life-cycle stage of the winter-summer period comprises a total ATU of 1,600 to 3,500 units, and the summer life-cycle stage of the winter-summer period comprises a total ATU of 400 to 1,500 units,
wherein the winter life-cycle stage includes light exposure for less than 12 hours in every 24 hour cycle, and the summer life-cycle stage includes light exposure for at least 12 hours in every 24 hour cycle,
wherein during the winter-summer period, the summer life-cycle stage immediately follows the winter life-cycle stage, and
wherein prior to the winter-summer period, the broodstock has been smoltified.

* * * * *